United States Patent [19]
Krug

[11] Patent Number: 5,987,216
[45] Date of Patent: Nov. 16, 1999

[54] DEFROSTING, DEICING, AND HEATING DEVICE

[76] Inventor: Schani Krug, 33 Pequossett Ave., North Falmouth, Me. 02556

[21] Appl. No.: 09/067,493

[22] Filed: Apr. 27, 1998

[51] Int. Cl.⁶ .................................................. A61H 33/08
[52] U.S. Cl. ............................................. 392/379; 454/75
[58] Field of Search ........................... 392/379; 219/201, 219/202, 203; 454/75, 76; 15/313

[56] References Cited

U.S. PATENT DOCUMENTS

| | | | |
|---|---|---|---|
| 2,304,691 | 12/1942 | Hund | 20/40.5 |
| 2,367,426 | 1/1945 | Patterson | 20/40.5 |
| 2,672,735 | 3/1954 | Fusselman | 62/89.5 |
| 2,718,037 | 9/1955 | Lintern | 20/40.5 |
| 3,624,354 | 11/1971 | Heidorn | 219/494 |
| 4,701,594 | 10/1987 | Powell | 219/219 |
| 5,014,606 | 5/1991 | Steiner et al. | 454/76 |
| 5,097,563 | 3/1992 | Cowan | 15/313 |
| 5,173,586 | 12/1992 | Gold | 219/203 |
| 5,206,476 | 4/1993 | Fresch | 219/202 |
| 5,419,005 | 5/1995 | Mori | 15/313 |
| 5,653,904 | 8/1997 | Adlparvar et al. | 219/203 |
| 5,681,218 | 10/1997 | Kishi et al. | 454/75 |

Primary Examiner—Teresa Walberg
Assistant Examiner—Quang Van
Attorney, Agent, or Firm—J. Charles Dougherty

[57] ABSTRACT

A device for defogging and deicing windshields and other glass surfaces is described. The device comprises two air channels that each circumscribe a glass surface, one channel along the interior edge of the glass surface and the other along the exterior edge. Each of the channels feature numerous outlets that disperse hot air onto the glass surface, thereby blanketing the glass surface in hot air on both sides. The two channels may be incorporated into a single boot made of rubber or some other material that doubles as a gasket to hold the windshield or other window in place. An electric heating element may be incorporated into the device so that warmed engine coolant passing through a traditional vehicle heater system coil is unnecessary. Several such devices may be incorporated into a vehicle to heat each glass surface individually.

17 Claims, 4 Drawing Sheets

DEFROSTING, DEICING, AND HEATING DEVICE

FIELD OF THE INVENTION

The present invention is generally directed to a heater, defroster, and deicer device for windshields or other glass surfaces exposed to temperature gradients. The present invention is more particularly directed to a heating, defrosting, and deicing device that comprises a series of small outlets that circumscribe a windshield or window and blanket both the interior and exterior of the windshield or window with warm air.

BACKGROUND OF THE INVENTION

Fogging and icing are persistent problems for passenger vehicles, aircraft, watercraft, trains, residential and commercial buildings, and all other devices that incorporate glass surfaces that are exposed to significant ambient air temperature gradients. The condition commonly known as fogging is caused by condensed water vapor collecting on a glass surface due to the difference in temperature between the glass and the adjacent air. This is a common problem for many types of vehicles (including cars, trucks, aircraft, watercraft, and trains) because the inside temperature of the vehicle often must differ significantly from the outside temperature to maintain passenger comfort. For example, if the interior temperature of a car is warmer than the outside temperature (as when a car is left outside in cold weather), the inside surface of the car windshield will be cooler than the air inside the vehicle. Air in contact with the inside surface of the windshield will thus cool down through contact with the glass. The cooling of this air reduces its ability to retain moisture, and thus the moisture that is released condenses on the inside surface of the windshield. Heating the inside surface of the windshield (as through a traditional car defroster system) will vaporize this condensed water, and will also prevent condensation from again appearing on the surface while the defroster is activated. This same problem is encountered with windows in residential and commercial buildings because of the difference in outside and inside temperature.

Icing, like fogging, can also be effectively removed or prevented through the heating of a windshield or other glass surface. Typically, icing on a vehicle's windshield occurs when the vehicle is not in motion and thus must be removed before the vehicle may be safely operated. The vehicle operator must then either wait for the vehicle defroster to melt the ice (which typically requires several minutes with a traditional defroster system), or must scrape the ice manually and suffer the outside cold temperatures during the process.

A particularly dangerous situation may occur when water at or near the freezing point strikes the relatively cool windshield of a vehicle while it is in motion, such as when cold water is splashed up onto a car windshield by a passing tractor trailer. Under certain conditions, water splashed up in this manner can "flash freeze" across a windshield virtually instantaneously, blocking a driver's vision entirely. Rapid, direct heating of the ice is necessary to quickly restore the operator's vision and thereby prevent a potentially life-threatening accident.

Traditional vehicle defroster mechanisms derive heat from the vehicle's engine coolant system. Liquid coolant passing through the engine block absorbs heat, thereby removing heat from the engine. The coolant then passes through a radiator or other type of heat exchanger where the coolant's heat is expelled and the coolant is ready to be passed through the engine block again in a closed loop. To heat the air for traditional vehicle defroster systems, air is blown across a heat exchange system through which the heated engine coolant passes, thereby transferring the heat energy from the coolant to the air. This heated air is then pushed by the blower through ductwork in the dashboard of the vehicle and onto the vehicle's windshield through large vents at the base of the windshield.

Several disadvantages result from this traditional approach. First, the air passing through the blower cannot be heated until the engine coolant is warmed due to engine fuel combustion. As a result, it may be several minutes after the engine begins running before the air being blown against the vehicle windshield is sufficiently heated to have any effect on fogging or icing. Second, the heated air is usually directed against the windshield in only one or a few locations, typically near the bottom of the front windshield. Consequently, only a small portion of the windshield is initially exposed to the heated air, and the remaining portions of the windshield are only gradually heated as the heated air slowly fills the passenger compartment through one or a few restricted openings. Third, there is no means to directly heat the exterior of the windshield while the interior is being heated; instead, the windshield exterior is only heated through the conduction of heat through the glass to the exterior side. Glass is a poor conductor of heat, resulting in still more delay and wasted energy while the glass is slowly heated through from the interior side before any defogging or deicing effect is realized on the exterior of the windshield. Fourth, traditional heater systems require a substantial amount of ductwork and a number of vents stretching through the passenger compartment to provide heat to occupants. Most vehicle heater systems provide uneven heat to the passenger compartment, with the front portion of a vehicle heating first and those passengers in the rear remaining uncomfortable until convection finally carries heat to the rear of the passenger compartment. Somewhat more even heating may be achieved through the use of additional ductwork and vents directed into the rear portion of the passenger compartment, but initial heating is still concentrated only in proximity to those handful of vents. Moreover, the additional ductwork required to deliver heat to rear passengers is bulky and thus reduces the passenger and cargo space within the vehicle.

Several attempts to improve the performance of traditional heater and defroster systems have been made. U.S. Pat. No. 2,304,691, issued to F. C. Hund, discloses a windshield defroster for an aircraft that distributes heated air along all edges of the windshield. Hund '691 teaches a double-pane windshield with the heated air being introduced between the panes of glass.

U.S. Pat. No. 2,672,735, issued to J. Fusselman, discloses a device to prevent condensation on refrigerated display case windows. Fusselman '735 teaches that a series of air outlets appear above and below the display case window, and distribute hot air across the exterior surface of the window. The display case's refrigeration unit provides the necessary heat for the unit.

U.S. Pat. No. 2,718,037, issued to A. R. Lintern, discloses a finned tube heater and defroster unit for a vehicle. Lintern '037 teaches a long tube extending beneath the length of a windshield, through which hot liquid from the engine coolant system is passed. The tube comprises a plurality of fins extending therefrom, over which air is blown from one end of the tube. The air is heated as it passes over the finned tube, and the fins direct the air upward against the inside surface of the windshield.

U.S. Pat. No. 5,173,586, issued to Peter N. Gold, discloses an electric heating attachment to free frozen windshield wipers resting at the bottom portion of the exterior of a vehicle windshield. The Gold '586 device extends along the bottom of a vehicle windshield and contacts the blade of windshield wipers resting against it.

U.S. Pat. No. 5,206,476, issued to John B. Fresch et al., teaches a supplementary vehicle heater that is placed in-line with a traditional vehicle heater system. The Fresch et al. '476 device comprises a polymer block that heats in reaction to the passage of electrical current therethrough. The device also has a number of holes through which air may pass. As air is pushed from the vehicle heater blower through the passages in the heated polymer block, the air is heated. This device is intended to heat air prior to the heating of engine coolant during the first few minutes after the vehicle is started.

None of these devices provide an ideal solution to the problem of heating, defrosting, and deicing within a passenger vehicle. In particular, none of these devices are useful to heat the interior and exterior of a vehicle windshield or other glass surface simultaneously, and therefore cannot quickly and efficiently remove fogging or icing no matter which surface of the windshield the fogging and icing appears on. Moreover, none of these devices effectively solve the special and extremely dangerous problem of "flash icing" which, as described above, may completely blind the operator of a vehicle while that vehicle is in motion. The slow conduction of heat from the inside of a windshield to the outside cannot remove ice quickly enough to safely clear the vision of the vehicle's operator. Finally, none of these devices are useful to heat the interior passenger compartment of a vehicle evenly and efficiently without the necessity of the multitude of vents and ductwork found in cars utilizing traditional heater systems.

SUMMARY OF THE INVENTION

The present invention overcomes the disadvantages of both traditional vehicle heater and defroster systems and the various attempts to improve upon those systems. In particular, the present invention is extremely effective in combating the dangerous condition of "flash icing" on a vehicle windshield. The advantages of the present invention are accomplished by circumscribing a section of glass with two separate air channels, one lying along the interior of the glass and one along the exterior. Each air channel dispenses hot air through tiny outlets along all edges of the glass, heating both sides of the glass evenly. This even heating of the glass from both sides eliminates any temperature gradient that exists across the glass much more quickly than simply heating one side of the glass and waiting for the heat to be conducted through to the other side. Moreover, because hot air is being dispensed directly onto the windshield of a vehicle as it travels, it substantially reduces the chance of "flash ice" from forming on the heated windshield exterior. Even in unusual circumstances when such ice could form, it would be quickly melted by direct contact with hot air blown onto the windshield exterior, thereby minimizing the safety hazard caused by this condition. If the present invention is used on building windows, it will make exterior window scraping or cleaning unnecessary, which is particularly important where scraping is impractical or impossible due to the height of the windows above ground or other difficulties in accessing the window.

The present invention utilizes a conventional blower motor and fan. Air from the blower is directed across a heat source, which may be either a coil through which heated engine coolant travels or an electric heater element. Optionally, the heater element may be used to provide heat only until the engine coolant reaches a sufficient temperature to provide heat for the system. In addition to the advantage of having heated air available immediately upon demand, the use of an electric heater element can also provide life-saving heat to a motorist stranded in extreme cold-weather conditions. If a vehicle stalls or runs out of gas under such conditions, a conventional heater system would be useless once the engine coolant temperature drops off after the engine quits running. However, an electric heater element would continue to provide heat as long as electrical power from the car battery is available. An auxiliary battery may be incorporated into the electrical system of the vehicle to provide a longer period of heat in such emergency situations; this auxiliary battery may be an important feature for motorists travelling in extreme winter conditions. This emergency feature would be useful not only for automobiles, but also for other vehicles that may be stranded in adverse weather, such as various types of watercraft.

Once the air is heated according to the present invention, it is directed via a duct system to a manifold that distributes the air to two channels; these two channels circumscribe each glass surface that is to be treated. One channel, the deicer channel, circumscribes the exterior edge of the glass surface; the other channel, the defroster channel, circumscribes the interior edge of the glass surface. Heated air exits these channels at a high rate of speed through a multitude of tiny outlets that appear at intervals along the channels. These outlets direct the hot air onto both sides of the glass surface from all edges simultaneously.

By heating both sides of a glass surface from all edges simultaneously, a more efficient deicing and defrosting action results. Fogging, or condensation of water, cannot appear on either side of the glass surface, and condensation that formed prior to activating the system is quickly dissipated regardless of which side of the glass surface it appears on. Likewise, because both sides of the glass are heated simultaneously, ice is quickly dissipated and is unlikely to form on the glass after the system has been running for even a short length of time.

In addition to the above advantages, the distribution of hot air all along the edges of a vehicle's glass surfaces also provides an efficient and even means of heating the passenger compartment of a vehicle. If glass surfaces in both the front and rear of the vehicle are heated in this manner, perhaps using two or more devices according to the present invention, heat will be distributed uniformly through the vehicle even more quickly. If separate heating systems are used for each glass surface (windshield, side windows, rear window, etc.), this heating system dispenses with the need for a multitude of vents dispersed throughout the vehicle, as well as the costly and bulky ductwork to connect them to the main heater fan and blower.

In one preferred embodiment of the invention, the defroster and deicer channels are incorporated into a single weatherproof boot that also functions as a gasket by holding the windshield or other glass surface in position within the windshield or window frame. In this form, the air pathways necessary for the system to operate are inconspicuous, since every vehicle requires some form of gasket between a windshield or other window and the vehicle body. Consequently, the addition of the boot to a vehicle would not detract from the appearance of the vehicle.

Optionally, a weather seal may be mounted above each of the exterior air outlets to prevent ice, dirt, and other agents from clogging those outlets. Normally the seals will be held closed by spring biasing or other conventional means. The pressure of air exiting the outlets will open the weather seals, allowing the hot air to escape and contact the windshield or other glass surface. In a different embodiment of the present invention, these seals are opened and closed by an electrical servo attached to hinges, which may be hidden under the cowl of a vehicle's hood. This hinges are connected to the seals, and may be operated by a switch on the dashboard, or by sensors that automatically detect ice or frost on the windshield or hood of the vehicle. When the system is turned off, the seals will fall back into position covering the outlets.

An object of the present invention is, therefore, the simultaneous heating of a vehicle windshield or other glass surface all along the circumference of that glass surface on both the interior and exterior sides.

A further object of the present invention is to heat both sides of a vehicle's glass surfaces without waiting for the vehicle's engine to warm up.

A further object of the invention is to provide a windshield or other glass surface defroster and deicer that also efficiently heats the passenger compartment of a vehicle without the necessity of numerous vents in the passenger compartment.

A further object of the present invention is to provide a defroster boot that integrates the air channels and numerous tiny outlets circumscribing the windshield or other glass surface into one compact, efficient, inconspicuous unit that also serves as a gasket along the edges of the glass surface.

Further objects and advantages of the present invention will be apparent from a consideration of the following detailed description of the preferred embodiments in conjunction with the appended drawings as briefly described following.

DETAILED DESCRIPTION OF THE PREFERRED EMBODIMENTS

Figure 1:
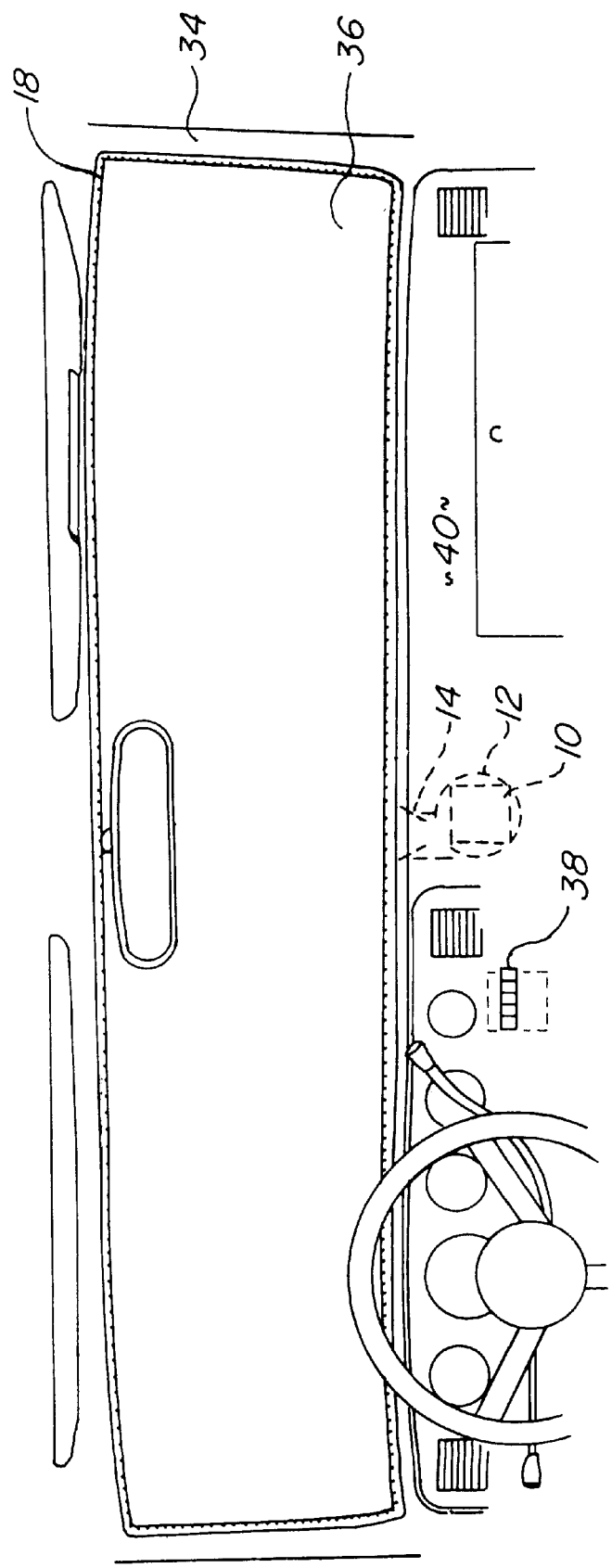
FIG. 1 is a partial cut-away perspective view from the passenger compartment of a vehicle showing a preferred embodiment of the present invention.

With reference to FIGS. 3, 4, 5, and 6, a preferred embodiment of the invention may be described. Although this detailed description is directed toward the device as installed on the windshield of a passenger automobile, it is understood that the device is useful on any other type of vehicle that has glass surfaces to allow an operator to see out, such aircraft, watercraft, and trains. It is also understood that the device may be used on glass surfaces other than windshields, such as side windows and rear windows. Moreover, the device may be used on commercial and residential buildings to maintain windows that are free from ice and frost.

A blower mechanism may be used to move air (brought from either the passenger compartment or from the exterior of the vehicle) through the device. Blower motor 10, which preferably is an electric motor, may be used to power blower fan 12, which forces air under pressure through air duct 14. The electric power for blower motor 10 may be supplied by the vehicle's electrical system, including a battery (not shown), and optionally an auxiliary battery (also not shown), which may be recharged by power from the vehicle's engine in a conventional manner.

Air may be pushed by blower fan 12 through heater element 16 which is downstream from blower fan 12 in air duct 14. Heater element 16 has a number of holes or passages through which air may travel. Heater element 16 is composed of an electrically resistive material that dissipates a relatively significant amount of heat energy in reaction to the passage of an electrical current through the material. Materials that exhibit this property include certain types of ceramics and plastic polymers. Heater element 16 may be connected to the vehicle's electrical system and, when the circuit is closed, will dissipate heat into the air passing through it. As a result, the air being pushed by blower fan 10 through heater element 16 will exit heater element 16 at an elevated temperature. In a preferred embodiment of the invention, heater element 16 may be used as the only source of heat in the device. Alternatively, heater element 16 may be replaced by a conventional heating coil (not shown) through which heated engine coolant passes. As a third alternative, heating coil 16 may be used to heat air when the vehicle's engine is first started, and then deactivated when the vehicle's engine coolant reaches a sufficient temperature to provide heating as in a conventional vehicle heater system.

The mouth of air duct 14 lies downstream from blower fan 12 and connects with boot 18. Boot 18 replaces the conventional gasket that would otherwise seat windshield 36 within vehicle body 34, and extends in a closed loop about the entire circumference of windshield 36. Air exiting heater element 16 is directed through the mouth of air duct 14 and into manifold channel 20. Manifold channel 20 runs the length of boot 18, forming a loop-shaped passage within boot 18. A series of manifold defroster connector passages 22 extend perpendicularly outward from manifold channel 20 to defroster channel 26. Like manifold channel 20, defroster channel 26 forms a loop-shaped passage through boot 18. Hot air in manifold channel 20 is pushed through defroster connector passages 22 and into defroster channel 26. Likewise, hot air is pushed from manifold channel 20 into manifold deicer connector passages 24 and into deicer channel 28.

Figure 7:
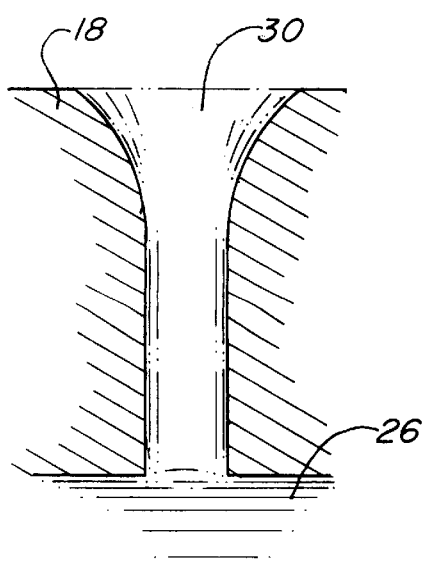
FIG. 7 is a cut-away side elevation view of a single air outlet of a preferred embodiment of the invention.

Hot air in defroster channel 26 and deicer channel 28 exits those passages through a series of outlets 30. Outlets 30 appear at intervals along boot 18 and direct air against both sides of windshield 36. A sufficient number of outlets 30 appear in boot 18 to uniformly blanket windshield 36 with hot air from all edges of windshield 36. In a preferred embodiment, the distal portion of each outlet 30 expands radially as the distal end of the outlet 30 is approached, as shown in FIG. 7. It is believed that this shape results in the most uniform distribution of hot air onto windshield 36. It is also believed that this shape causes eddy currents of warm air to form on the windshield, which increases the efficiency of the defrosting and deicing action of the device, and also more uniformly heats the passenger compartment of the vehicle.

Turning now to FIG. 1, a preferred embodiment of the present invention is depicted in conjunction with the windshield of a passenger automobile. Boot 18, which contacts windshield 36 along its entire edge and seats windshield 36 in place with respect to vehicle body 34, has numerous outlets 30 directed toward windshield 36. Blower motor 10 and blower fan 12 are shown under the dashboard 40 of the vehicle, with air duct 14 leading to manifold channel 20 (not shown) in boot 18. Control panel 38 may be used to activate the device, and may consist of knobs, dial, push buttons, or other standard control means as are well known in the art.

Figure 2:
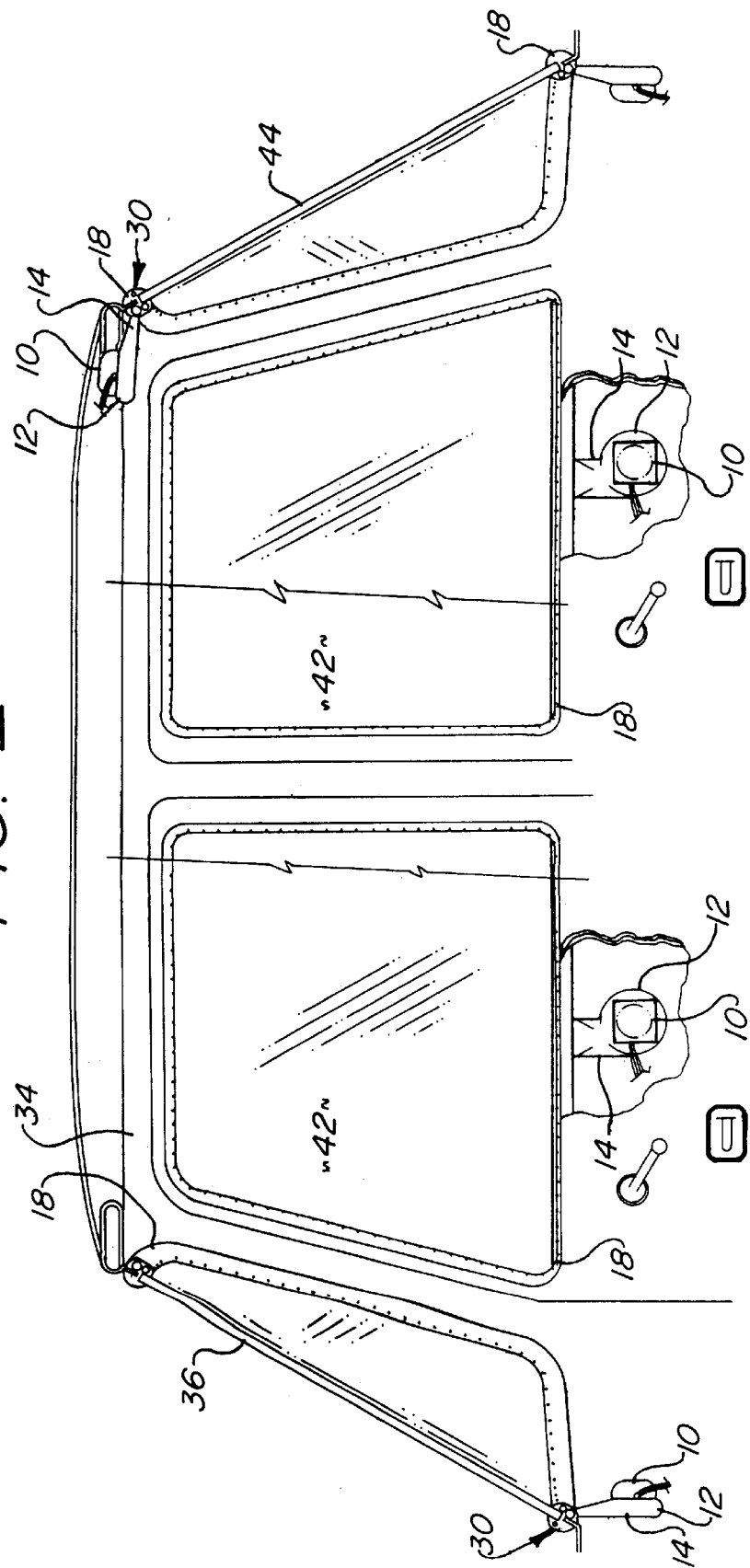
FIG. 2 is a partial cut-away perspective view from the outside of a vehicle showing a preferred embodiment of the present invention.
Figure 3:
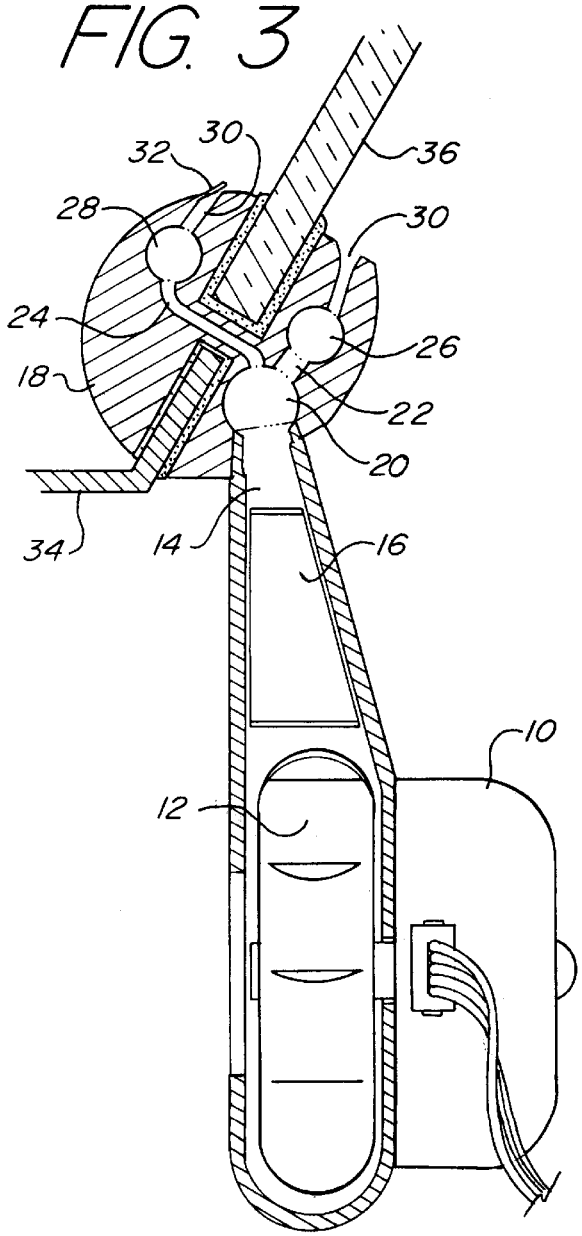
FIG. 3 is a cut-away side elevation view of a preferred embodiment of the invention detailing a section at the base of a vehicle's windshield.
Figure 4:
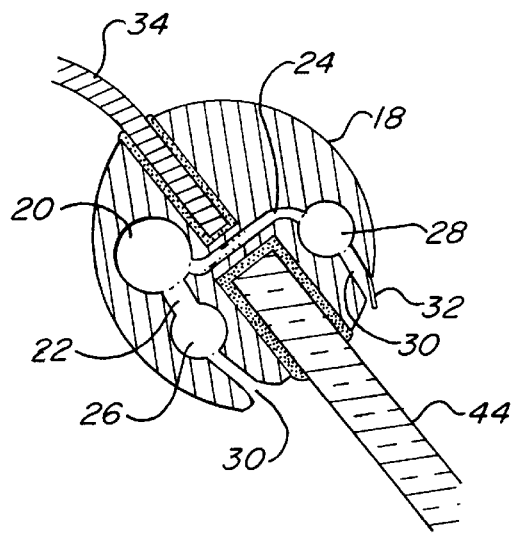
FIG. 4 is a cut-away side elevation view of a preferred embodiment of the invention detailing a section at the top of a vehicle's rear glass.
Figure 5:
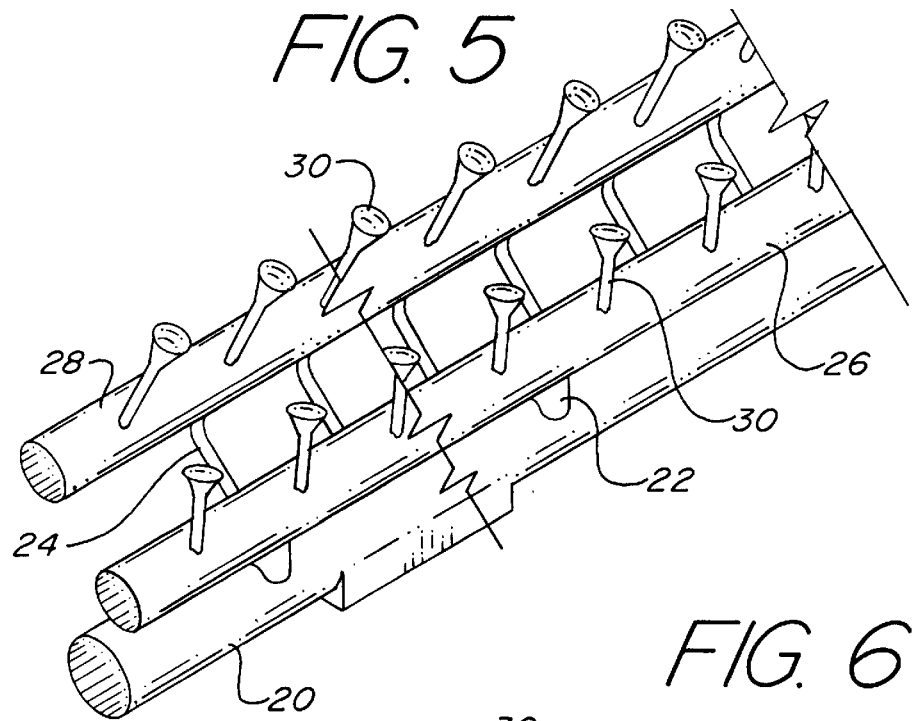
FIG. 5 is a cut-away perspective view of the air channels and outlets of a preferred embodiment of the invention.
Figure 6:
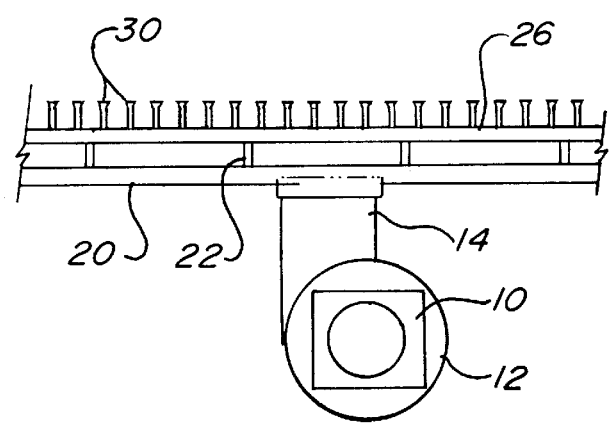
FIG. 6 is a cut-away side elevation view of the air channels, outlets, blower, and ductwork of a preferred embodiment of the invention.

FIG. 2 depicts a vehicle incorporating several separate devices according to a preferred embodiment of the present invention, showing such a device on the vehicle's windshield 36, side windows 42, and rear window 44. Boots 18 circumscribe each window, allowing outlets 30 to blanket each window with warm air both on the interior and exterior surfaces. Separate blower motors 10 and blower fans 12 may be used for each of the vehicle windows as in FIG. 2, or warm air may be provided to multiple windows by a single blower motor 10 and blower fan 12 through appropriate connections using air ducts 14. If separate blower motors 10 and blower fans 12 are used, the complicated ductwork required to direct air into these areas of the vehicle is unnecessary. It should be noted that in the embodiment shown in FIG. 2, boot 18 must be split into two components at the base of side windows 42 so that the windows may be raised and lowered; as a result, no manifold defroster connector passages 22 nor manifold deicer connector passages 24 may pass through this lower portion of boot 18.

The present invention has been described with reference to certain preferred and alternative embodiments which are exemplary only and not intended to exclude certain variations and modifications which would occur to those skilled in the art nor should the embodiments disclosed herein be considered as limiting to the full scope of the invention as set forth in the appended claims.

What is claimed is:

1. An apparatus for defogging and deicing a transparent material having an interior and exterior surface, the apparatus comprising:
   (a) a blower;
   (b) a heat source downstream from said blower; and
   (c) a boot circumscribing the transparent material, said boot being downstream from said heat source and having a plurality of outlets pointed toward the interior surface of the transparent material and having a plurality of outlets pointed toward the exterior surface of the transparent material.

2. The apparatus of claim 1, wherein said boot has a defroster channel running the length of said boot adjacent the interior surface of the transparent material, and said boot has a deicer channel running the length of said boot adjacent the exterior surface of the transparent material.

3. The apparatus of claim 2, wherein said boot has a manifold channel running its length, and wherein the manifold channel may receive air from said heat source.

4. The apparatus of claim 3, wherein said boot has at least one manifold defroster connector passage therethrough, the manifold defroster connector passage providing an air passageway between the manifold channel and the defroster channel, and wherein said boot has at least one manifold deicer connector passage therethrough, the manifold deicer connector passage providing an air passageway between the manifold channel and the deicer channel.

5. The apparatus of claim 1, wherein said heat source is a heating element that radiates heat in reaction to the passing of an electric current through said heating element.

6. The apparatus of claim 1, wherein the outlets each have a proximal and distal end, and wherein the diameter of each of the outlets is greater at the distal end than at the proximal end.

7. The apparatus of claim 1, further comprising a plurality of seals, each of said seals lying above at least one of the outlets.

8. The apparatus of claim 7, further comprising at least one biasing means, each of said biasing means connecting at least one of said seals to said boot and holding said seal closed over at least one of the outlets when no air is passing through the outlets.

9. The apparatus of claim 7, further comprising:
   (a) at least one hinge, each of which connects at least one of said seals to said boot; and
   (b) at least one servo, each of which communicates with at least one of said hinges to open and close said hinges in response to a signal.

10. The apparatus of claim 9, further comprising a sensor, said sensor operable to send a signal to said servos in response to the presence of at least one of ice, frost, and condensation on the transparent material.

11. An apparatus for defogging and deicing a transparent material having an interior and exterior surface, the apparatus comprising:
   (a) a blower;
   (b) a heat source downstream from said blower;
   (c) a defroster channel downstream from said heat source, said defroster channel circumscribing the interior surface of the transparent material and said defroster channel having a plurality of outlets therethrough, wherein said outlets are located on all sides of the interior surface of the transparent material; and
   (d) a deicer channel downstream from said heat source, said deicer channel circumscribing the exterior surface of the transparent material and said deicer channel having a plurality of outlets therethrough, wherein said outlets are located on multiple sides of the exterior surface of the transparent material.

12. The apparatus of claim 11, wherein said outlets located on multiple sides of the exterior surface of the transparent material are located on all sides of the exterior surface of the transparent material.

13. An apparatus for defogging and deicing the glass surfaces of a vehicle, the apparatus comprising:
   (a) at least one blower;
   (b) at least one heat source, each of said at least one heat source lying downstream from one of said at least one blower;
   (c) at least one defroster channel, each of said at least one defroster channel lying downstream from one of said at least one heat source, each of said at least one defroster channel circumscribing the interior surface of one of the glass surfaces and each of said at least one defroster channel having a plurality of outlets therethrough wherein said outlets are located on all sides of the interior of that glass surface; and
   (d) at least one deicer channel, each of said at least one deicer channel lying downstream from said at least one heat source, said at least one deicer channel circumscribing the exterior surface of one of the glass surfaces and said at least one deicer channel having a plurality of outlets therethrough wherein said outlets are located on multiple sides of the exterior of that glass surface.

14. The apparatus of claim 13, wherein said outlets located on multiple sides of the exterior of one of the glass surfaces are located on all sides of the exterior of that glass surface.

15. The apparatus of claim 11, further comprising:
  (e) a manifold channel, said manifold channel lying downstream from said heat source and said blower, but upstream from said defroster channel and said deicer channel;
  (f) at least one manifold defroster connector passage, said manifold defroster connector passage providing an air passageway between said manifold channel and said defroster channel; and
  (g) at least one manifold deicer connector passage, said manifold deicer connector passage providing an air passageway between said manifold channel and said deicer channel.

16. The apparatus of claim 11, wherein said heat source is a heating element that radiates heat in reaction to the passing of an electric current through said heating element.

17. The apparatus of claim 11, wherein the outlets each have a proximal and distal end, and wherein the diameter of each of the outlets is greater at the distal end than at the proximal end.

* * * * *